United States Patent [19]

Bez

[11] 4,050,537
[45] Sept. 27, 1977

[54] INSTALLATION FOR THE ENERGY ABSORPTION OF VEHICLES

[75] Inventor: Ulrich Bez, Gerlingen, Germany

[73] Assignee: Dr. Ing. h.c.F. Porsche Aktiengesellschaft, Germany

[21] Appl. No.: 534,789

[22] Filed: Dec. 20, 1974

[30] Foreign Application Priority Data

Dec. 22, 1973 Germany .............................. 2364300

[51] Int. Cl.² .......................................... B60R 21/00
[52] U.S. Cl. ...................................... 180/91; 280/770; 296/28 E
[58] Field of Search ............... 280/150 AB, 728, 734, 280/735, 736, 743, 748, 751, 770; 180/91, 82 R, 103; 188/1 C; 293/2, 3, 4, 5; 296/28 R, 28 E

[56] References Cited

U.S. PATENT DOCUMENTS

| 2,829,915 | 4/1958 | Claveau | 296/28 R |
|---|---|---|---|
| 3,110,515 | 11/1963 | Loftin | 296/28 R |
| 3,219,384 | 11/1965 | Graham | 296/28 R |
| 3,514,124 | 5/1970 | Richardson | 280/150 AB |
| 3,617,073 | 11/1971 | Landsman et al. | 280/150 AB |
| 3,778,083 | 12/1973 | Hamasaki | 280/150 AB |
| 3,791,667 | 2/1974 | Haviland | 280/150 AB |
| 3,799,576 | 3/1974 | Fiala | 280/150 AB |
| 3,801,123 | 4/1974 | Jira | 280/150 AB |
| 3,810,523 | 5/1974 | Yamaguchi et al. | 280/150 AB |
| 3,822,076 | 7/1974 | Mercier et al. | 293/4 |
| 3,853,199 | 12/1914 | Hirashima et al. | 180/91 |
| 3,907,358 | 9/1975 | Barenyi et al. | 206/28 R |

FOREIGN PATENT DOCUMENTS

| 569,848 | 1/1959 | Belgium | 296/28 R |
|---|---|---|---|
| 1,273,397 | 7/1960 | France | 180/91 |
| 2,223,880 | 5/1972 | Germany | 296/28 E |
| 236,912 | 3/1945 | Switzerland | 296/28 R |
| 235,418 | 4/1945 | Switzerland | 296/28 R |

*Primary Examiner*—Philip Goodman
*Assistant Examiner*—Jack D. Rubenstein
*Attorney, Agent, or Firm*—Craig & Antonelli

[57] ABSTRACT

An installation for the energy absorption of motor vehicles, in which a deformation member has a wall structure delimiting a hollow space which cooperates with a pressure installation that acts upon the hollow space during an accident in dependence on a trigger mechanism and thereby deforms the wall structure in such a manner that the energy absorption efficacy of the deformation member is increased.

15 Claims, 5 Drawing Figures

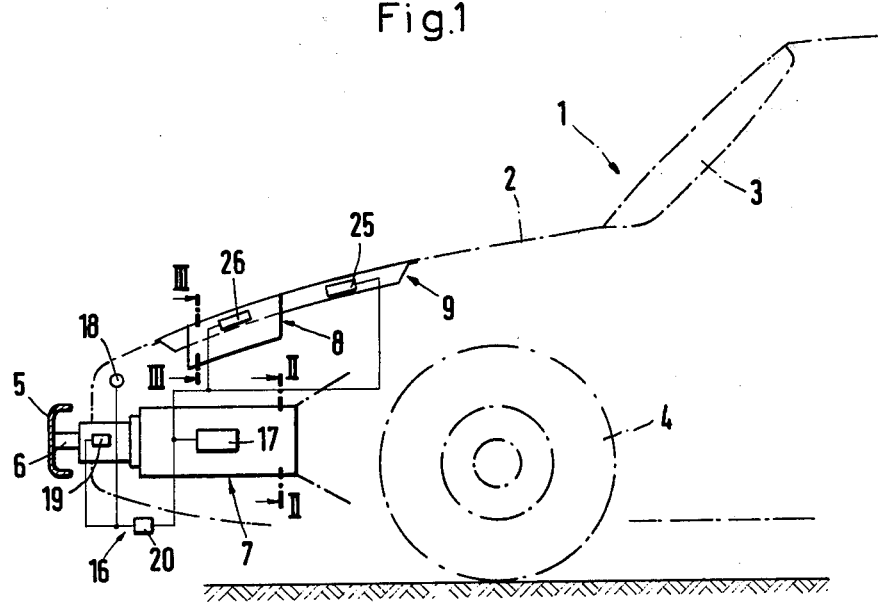
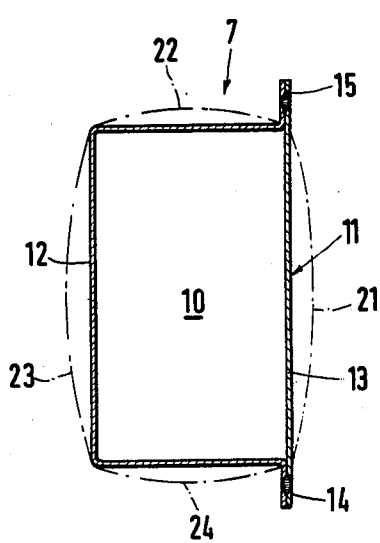
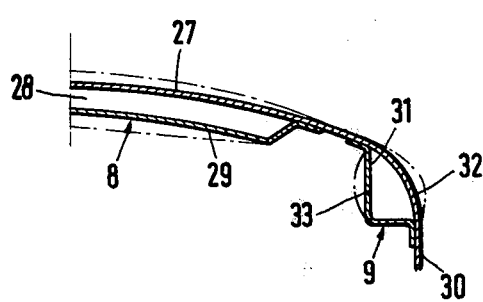

INSTALLATION FOR THE ENERGY ABSORPTION OF VEHICLES

The present invention relates to an installation for the energy absorption for vehicles, especially of motor vehicles with a deformation member which has a wall structure delimiting a hollow space.

Deformation members of the aforementioned type are known in the art which during an accident dissipate energy by deformation work. The energy absorption of such deformation members is strongly reduced with a corresponding buckling or denting interaction. It is known from the teachings in strength of materials that pipe-like bearers with circular or eliptically shaped cross section have a high degree of rigidity. Such cross sections, however, are realizable only with difficulty in the series motor vehicle construction, especially in the passenger motor vehicle construction since their manufacture requires production measures that are high in cost and involve large expenditures and frequently cannot be used for space reasons.

It is therefore the aim of the present invention to provide a deformation member which excels by a high energy absorption and whose manufacture is possible in a favorable manner.

This is achieved according to the present invention in that the deformation member cooperates with a pressure installation which preferably at the beginning of an accident acts upon the hollow space in dependence on a trigger mechanism and deforms the wall structure in such a manner that the energy absorption efficiency of the deformation member is increased. The pressure installation includes an explosive charge which is triggered by means of an ignition device. The explosive charge is provided on the inside of the deformation member. The trigger mechanism is constituted by a collision sensor. However, it may also be actuatable by a member which becomes effective under force influence. The deformation member is constituted by a bearer having a rectangular cross section. However, the possibility also exists that the deformation member is constituted by a bearer with a circularly shaped or eliptically shaped cross section. The deformation member is preferably coordinated to an outer wall section of the body. The outer wall section may be constituted by a hood.

The advantages achieved with the present invention reside in that as a result of the wall structure of the deformation member which deforms during an accident, the deformation member possesses a high denting and buckling strength and therewith absorbs large amounts of energy. The deformation is such that the wall structure has at least sectionwise a circular or eliptical shape. Additionally, the energy absorption is further improved by the internal pressure which builds up within the hollow space. As a result of this measure, a deformation member which can be manufactured without large manufacturing expenditures and which has a rectilinear or only insignificantly curved wall structure, exhibits a good energy absorption capacity. The deformation of the wall structure of the deformation member can be carried out readily by means of the pressure installation including an explosive charge. Furthermore, it is of advantage if the deformation member is constituted by a bearer having a rectangular, circular or eliptically shaped cross section. Also the possibility exists to coordinate the deformation member to a body section, for example, to the hood or a fender so that also these parts, which as such exhibit no deformation capacity or only a slight deformation capacity, can be used for the energy absorption.

These and further objects, features and advantages of the present invention will become more apparent from the following description when taken in connection with the accompanying drawing which shows, for purposes of illustration only, two embodiments in accordance with the present invention, and wherein:

FIG. 1 is a side elevational view of the front section of a motor vehicle in accordance with the present invention;

FIG. 2 is a cross-sectional view, on an enlarged scale, taken along line II—II of FIG. 1;

FIG. 3 is a cross-sectional view, on an enlarged scale, taken along line III—III of FIG. 1;

Figure 4:
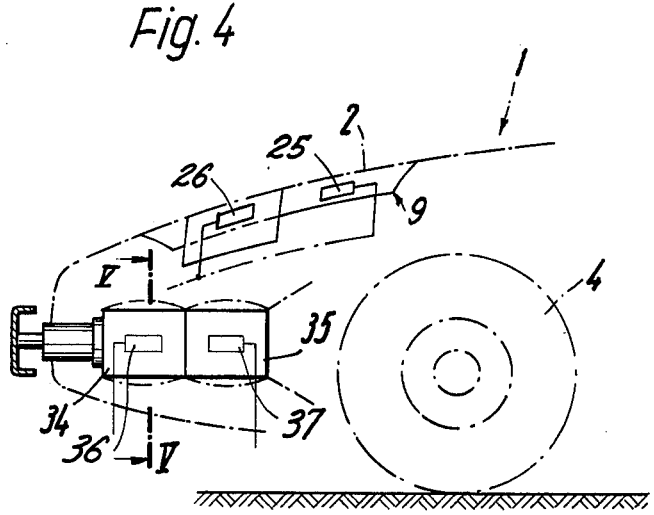
FIG. 4 is a side elevational view, corresponding to FIG. 1, of a modified embodiment of a motor vehicle in accordance with the present invention.

Referring now to the drawing wherein like reference numerals are used throughout the various views to designate like parts, the motor vehicle 1 includes a body 2 with a windshield 3 and a wheel 4. The body 2 is delimited within the end area by a bumper 5 which cooperates with a damping element 6. Therebeyond, energy-absorbing deformation members generally designated by reference numerals 7, 8 and 9 are provided at the body 2.

The deformation member 7 is constituted by a bearer of sheet metal, preferably of steel sheet metal material, which includes a wall structure 11 closing a hollow space 10 (FIG. 2). The wall structure 11 is constituted by a hat-shaped profile 12 and a wall 13 closing the open side of the hat profile. The hat profile 12 and the wall 13 are connected with each other along flanges 14 and 15. The bearer has a rectangular cross section with rectilinear walls. A pressure installation generally designated by reference numeral 16 is connected with the deformation member 7. The pressure installation 16 serves for acting upon the hollow space 10 and is constituted by an explosive charge 17. The explosive charge 17 is arranged within the hollow space 10. The pressure installation 16 may also be, for example, of hydraulic or pneumatic type of construction of conventional type.

Trigger mechanisms 18 and 19 are connected to the pressure installation 16. The trigger mechanism 18 is constituted by a collision sensor. In contrast thereto, the trigger mechanism 19 includes a member which actuates the trigger mechanism under force influence.

At the beginning of an accident, the explosive charge 17 is ignited either by the collision sensor (trigger mechanism 18) or also by the member (trigger mechanism 19) which is actuatable by means of a force acting upon the bumper 5, and by the use of an ignition device 20 of conventional type, whereby the hollow space is acted upon with a detonation wave exerting a high dynamic pressure and the wall structure 11 is deformed. The wall structure 11 thereafter includes deformed sections 21, 22, 23 and 24. It is achieved by these convexly shaped sections 21, 22, 23 and 24 of the wall structure 11 which are deformed outwardly circularly-like or eliptically-like that the deformation member exhibits an increased denting and buckling strength as compared to the non-deformed condition so that it is characterized by an improved energy absorption.

The deformation members 8 and 9 also include explosive charges 25 and 26 and are connected to the described trigger mechanisms 18 and 19.

According to FIG. 3, the deformation member 8 is constituted by a hood 27 which includes a hollow space 28 that is delimited by a wall structure 29. The wall structure 29 assumes after the ignition of the explosive charge 25 the position indicated in dash and dot lines.

Adjacent the deformation member 8 is arranged the deformation member 9 which is arranged within the area of a fender 30 and includes a wall structure 31 which is deformed on the one hand, by an outer wall section 32 and, on the other, by an angularly shaped inner wall 33. The position of the wall structure is indicated in dash and dot lines which the wall structure assumes after the ignition of the explosive charge 26.

Figure 5:
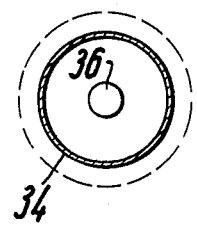
FIG. 5 is a cross-sectional view taken along line V—V of FIG. 4.

According to FIG. 4, two deformation members 34 and 35 are arranged disposed one behind the other. They include explosive charges 36 and 37 and have a circularly shaped cross section. The explosive charges 36 and 37 can be ignited either simultaneously or with a difference in time, i.e., with a time delay. After the completed ignition of the explosive charges 36 and 37, the deformation members 34 and 35 have the shape illustrated in dash and dot lines (FIGS. 4 and 5).

In other preferred embodiments, the deformation members have an eliptical cross-section.

While I have shown and described only two embodiments in accordance with the present invention, it is understood that the same is not limited thereto but is susceptible of numerous changes and modifications as known to those skilled in the art. Thus, the deformation members may also be arranged at different places and may be actuated by means of suitable installations. Also, several parameters may be used for the triggering of the pressure installation. Therebeyond, bearers of suitable cross section may be used as deformation members. Hence, I do not wish to be limited to the details shown and described herein but intend to cover all such changes and modifications as are encompassed by the scope of the appended claims.

I claim:

1. An energy absorbing installation for vehicles comprising:
    means for increasing the denting and buckling stength of a vehicle body member including a deformation means having a wall structure defining a hollow space, and being associated with a vehicle body member, the vehicle body member in its undeformed configuration defining a portion of a vehicle body profile;
    pressurizing means in communication with said hollow space for generating an increase in pressure within said space sufficient to outwardly deform said wall structure and said body member; and
    triggering means operatively connected to said pressurizing means and responsive to a vehicle collision for actuating said pressurizing means and thereby increasing the denting and buckling strength of said vehicle body member, and accordingly the energy absorbing ability by virtue of the changed shape produced.

2. An installation according to claim 1, wherein said wall structure is formed of sheet metal.

3. An installation according to claim 1, wherein the wall structure exhibits a first geometric configuration that is polygonal shaped with rectilinear side walls defining said hollow space prior to deformation and a second geometric configuration wherein said side walls are outwardly curved subsequent to deformation.

4. An installation according to claim 1, wherein said vehicle body member forms a portion of said wall structure.

5. An installation according to claim 4, wherein said vehicle body member is formed by portions of a vehicle fender.

6. An installation according to claim 4, wherein said vehicle body member is formed by portions of a vehicle hood.

7. An installation according to claim 2 wherein said wall structure is shaped in the form of an enclosure having a wall extending circumferentially about said hollow space with outwardly extending flanges on one end thereof and a transverse wall closing the other end thereof so as to present a profile in cross-section resembling a top-hat.

8. An installation according to claim 1, wherein said triggering means includes means for actuating said pressurizing means at the beginning of a collision.

9. An installation according to claim 1, wherein the wall structure exhibits a first curved geometric configuration prior to deformation and a second curved configuration subsequent to deformation.

10. An installation according to claim 9, characterized in that said second curved configuration is substantially eliptical shaped.

11. An installation according to claim 1, further comprising a vehicle body front section connected to and carrying said wall structure.

12. An installation according to claim 1, characterized in that the pressurizing means includes an explosive charge which is triggered by means of an ignition device.

13. An installation according to claim 12, characterized in that the explosive charge is provided on the inside of the deformation means.

14. An installation according to claim 13, characterized in that the trigger means includes a collision sensor.

15. An installation according to claim 13, characterized in that the trigger means includes a member which becomes operable under force influence.

* * * * *